Figure 1:
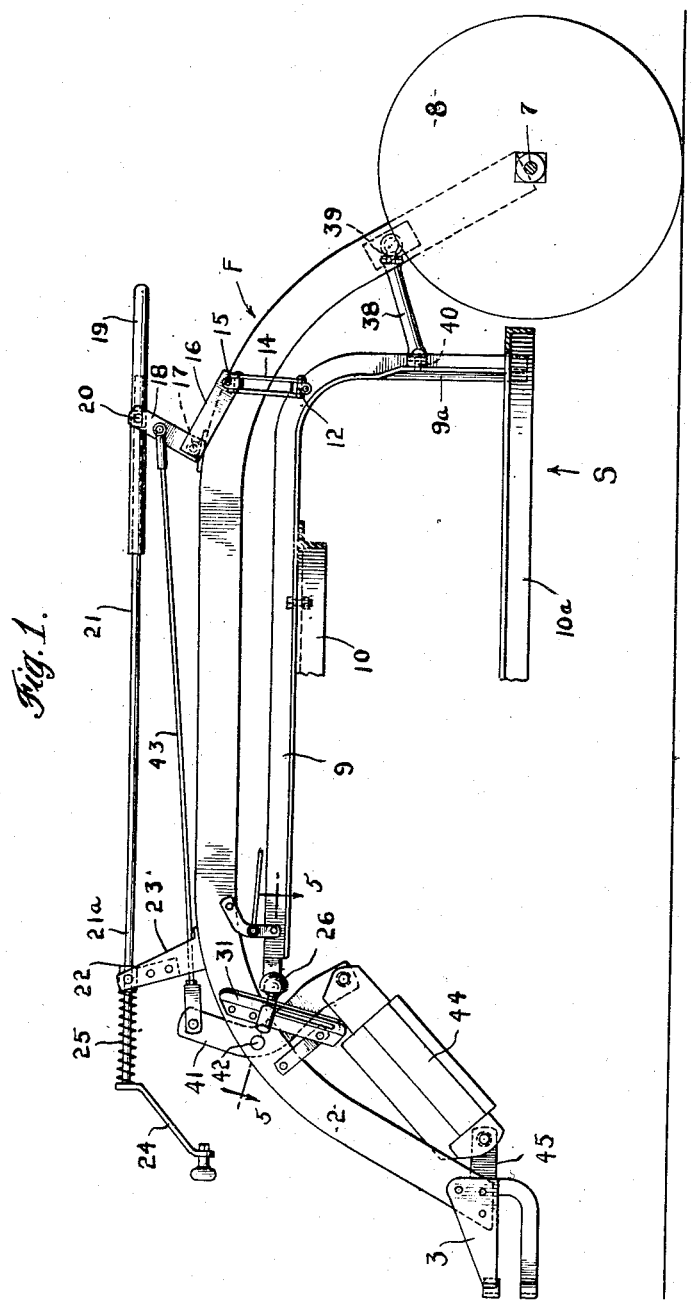

Feb. 19, 1957  M. J. HAPPE ET AL  2,781,626
RAKE SUSPENSION FOR SIDE DELIVERY RAKE
Filed Dec. 31, 1953  3 Sheets-Sheet 1

Inventors
Melvin J. Happe
Horace G. McCarty
Richard E. Babcock Jr.
By
Attorney

Feb. 19, 1957　　　M. J. HAPPE ET AL　　　2,781,626
RAKE SUSPENSION FOR SIDE DELIVERY RAKE
Filed Dec. 31, 1953　　　　　　　　　　　　3 Sheets-Sheet 2

Inventors
Melvin J. Happe
Horace J. McCarty
By Richard E. Babcock Jr.
Attorney

Feb. 19, 1957  M. J. HAPPE ET AL  2,781,626
RAKE SUSPENSION FOR SIDE DELIVERY RAKE
Filed Dec. 31, 1953  3 Sheets-Sheet 3
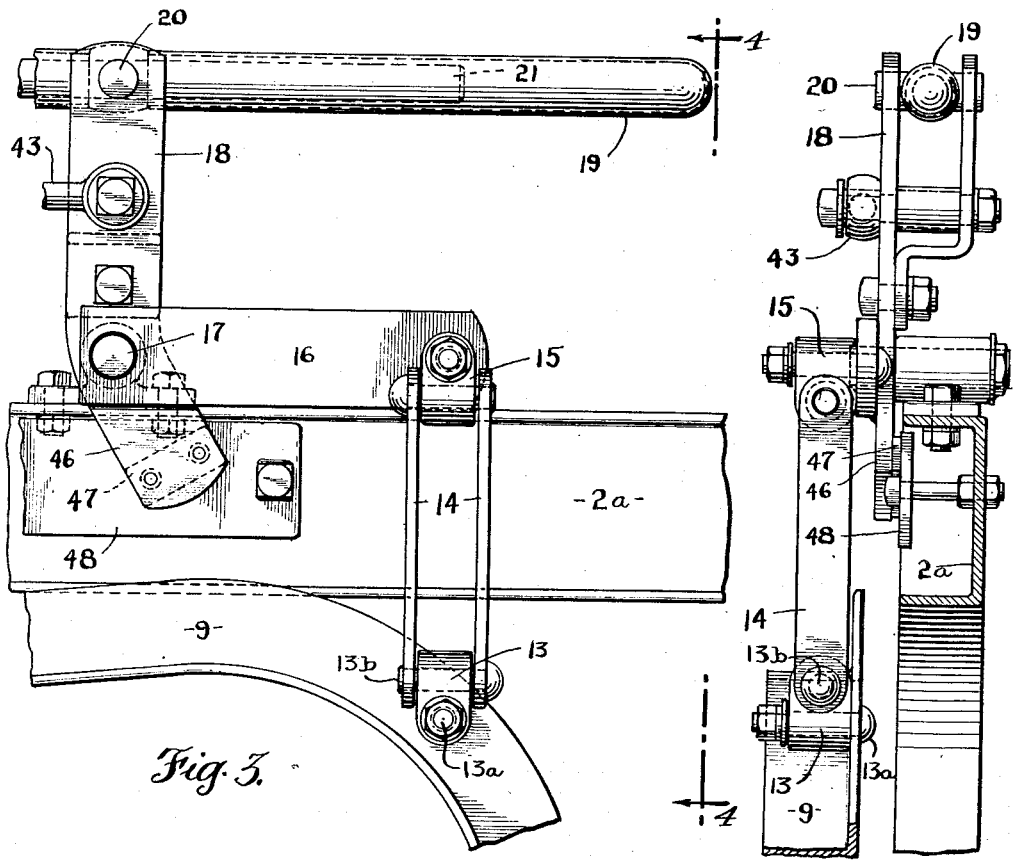
Fig. 3.
Fig. 4.
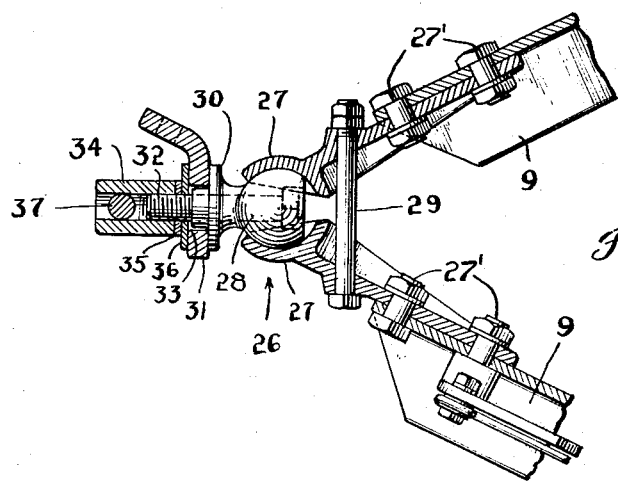
Fig. 5.
Inventors
Melvin J. Happe
Horace G. McCarty
Richard E. Babcock Jr.
Attorney

United States Patent Office 2,781,626
Patented Feb. 19, 1957

2,781,626

RAKE SUSPENSION FOR SIDE DELIVERY RAKE

Melvin J. Happe, New Holland, and Horace G. McCarty, Ephrata, Pa., assignors, by mesne assignments, to Sperry Rand Corporation, New Holland, Pa., a corporation of Delaware Application December 31, 1953, Serial No. 401,548

5 Claims. (Cl. 56—377)

This invention relates to a side delivery rake of the class in which the raking element is carried by a sub-frame which is adjustably suspended from a main ground traversing frame to be drawn along behind a tractor or other vehicle.

In accordance with the invention the sub-frame is suspended at each of three relatively spaced locations or points which are independently vertically adjustable whereby the vertical adjustment of any one such point will tilt the frame about an axis extending through the other two points. In such an arrangement the sub-frame rotatably supports a raking reel, the major axis of which extends diagonally or generally transversely to the line of draft of the main frame.

It is a primary object of the instant invention to provide means for adjustably rocking the sub-frame about an axis generally parallel to the major axis of its raking reel to thus adjust the angle at which the rake tines engage the ground, while at the same time bodily adjusting the position of the sub-frame whereby certain portions thereof during their rocking movement will be maintained clear of the ground wheels or other parts of the main frame. To this end the sub-frame is suspended from the main frame for bodily longitudinal movement and for tilting movement about a relatively transverse axis generally parallel to the major axis of the raking reel, the sub-frame being pivotally connected at a point radially spaced from said transverse axis to a control element adjustable to different locations along a path having both longitudinal and vertical components so that adjustment of the said control element will rock the sub-frame about its axis while simultaneously moving it bodily in a longitudinal direction.

It is also an object to provide in conjunction with such an adjustable sub-frame a novel arrangement of stabilizing link pivotally connected between the main frame and sub-frame to laterally position the sub-frame, the connection of the link to the sub-frame being so located that the movement of such connection responsive to rocking adjustment of the sub-frame is substantially equal and opposite to the resulting bodily movement of the sub-frame. By virtue of this arrangement it is possible to avoid lateral displacement of the sub-frame resulting from the action of the link incident to bodily movement thereof.

Other objects are: To provide a central control means for simultaneously raising the sub-frame regardless of the independently adjusted positions of its several points of suspension; and to provide a novel mechanism for dampening vertical vibration of the sub-frame incident to passage of the rake over uneven terrain.

Figure 2:
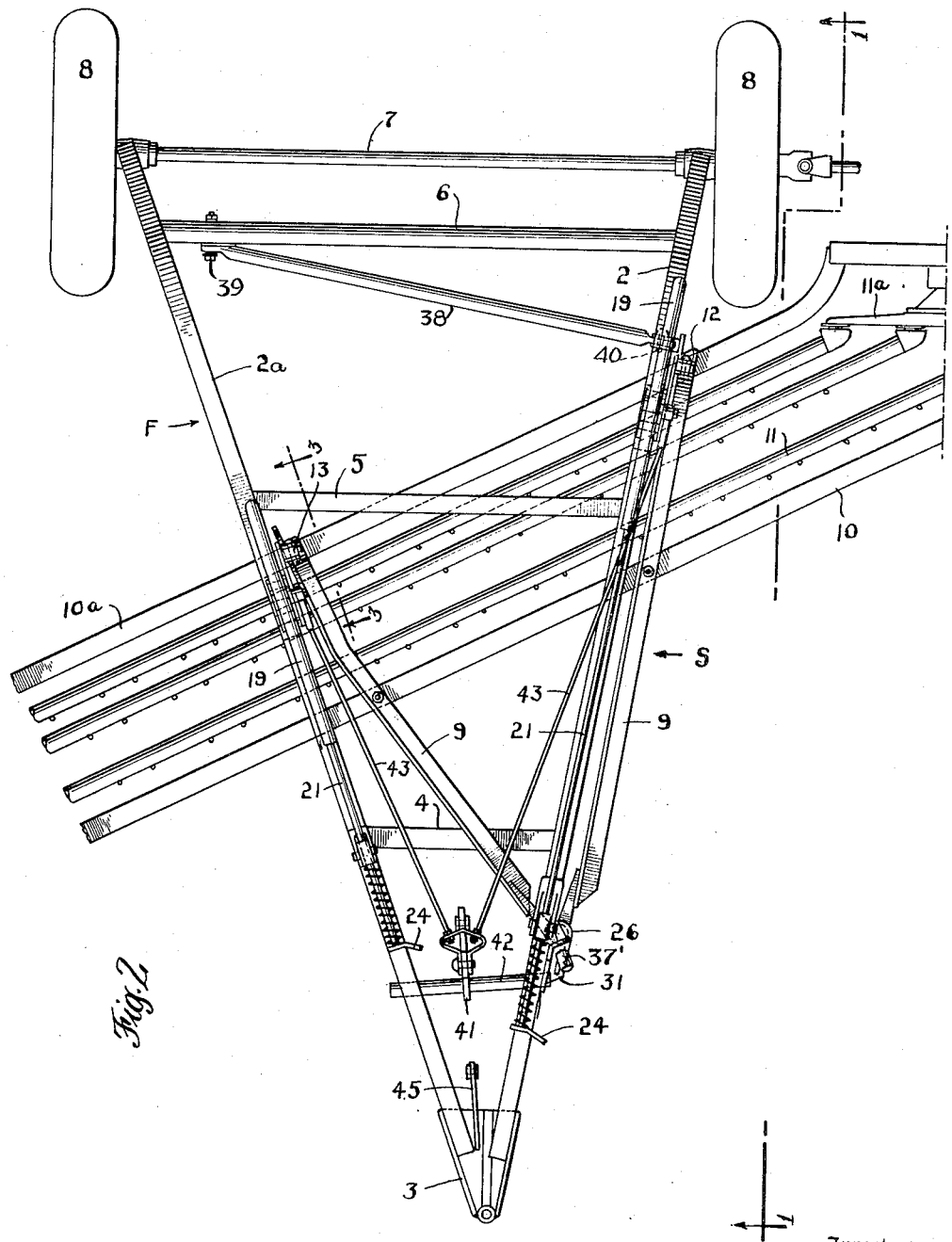

The foregoing objects and advantages are attained by the preferred embodiment of the invention illustrated in the accompanying drawings in which:

Figure 1 represents a side elevational view of a side delivery rake, the raking reel being omitted and portion of the sub-frame being broken away and in section on the line 1—1 of Figure 2;

Figure 2, a plan view of Figure 1 with a portion of the rotary raking reel shown more or less diagramatically;

Figure 3, an enlarged fragmentary side elevational view showing certain suspension mechanism viewed as indicated by the line 3—3 in Figure 2, but with the parts shown in an intermediate position of adjustment;

Figure 4, a cross-section on the line 4—4 of Figure 3; and

Figure 5, an enlarged plan section taken substantially on the line 5—5 of Figure 1 and showing the ball and socket connection between the main frame and sub-frame in detail.

Referring now in detail to the drawings, the main frame of the rake structure generally designated F comprises a pair of medially upwardly arched rigid channel members 2—2a interconnected at their forward ends by a clevis or hitch member 3 whereby the frame may be coupled to the drawbar of a tractor and towed therebehind in usual manner. These frame members 2 and 2a diverge rearwardly from the hitch member 3 and are suitably interconnected as by the cross braces 4, 5, and 6, respectively, shown in Figure 2. Journalled between the depending rear ends of these members 2—2a is an axle 7 on which are carried ground wheels 8—8 for supporting the rear end of the frame F as same is drawn over the ground behind the tractor.

Suspended beneath the main frame F in advance of its wheels 8—8 is the adjustable sub-frame S which includes a pair of forwardly converging frame members 9—9 supporting a rake basket 10 in which may be operatively disposed a raking reel of the well known roller bar type such as is exemplified in the Martin U. S. Patent 818,899 of April 24, 1906, in which a plurality of raking bars 11 are supported between relatively longitudinally and laterally displaced spiders 11a rotating about parallel axes in well known manner, as partially shown in Figure 2. The rake basket 10 and the raking reel therein are disposed with their major axes extending generally transversely and preferably diagonally of the line of draft of the main frame F to rake the hay from in front of the wheels 8—8 and form it in a windrow on the right hand side of the machine as shown in Figure 2. In order to simplify the driving connection between the rear or right hand end of the raking reel and its adjacent wheel 8, as well as to cause this end of the basket 10 and reel to ride over irregularities in the ground with the adjacent wheel 8, this rearward end of the rake basket 10 is disposed just in advance of the wheel 80 and terminates closely adjacent the axis about which the wheels 8 rotate.

The foregoing structure is well known and constitutes no part of the present invention, but is thus briefly described merely in order to promote an intelligent understanding of the present invention.

In accordance with the invention, the sub-frame S is universally suspended from the main frame at each of three relatively spaced points or locations which are independently vertically adjustable so that vertical adjustment of any one such point or location will tilt the sub-frame about an axis extending between the remaining two points.

Two of such points in the instant embodiment are defined by the universal fittings or connections 12 and 13 respectively which are in relative alignment parallel to the major axis of the rake basket 10. Each of these fittings 12 and 13 is constructed and arranged as shown in Figures 3 and 4 in which it will be seen that fitting 13 is connected by relatively transversely disposed pivot pins 13a and 13b to the adjacent sub-frame member 9 and to its associated links 14 respectively.

These fittings 12 are respectively carried by links 14 which are universally swingably suspended as at 15 from the free ends of supporting levers 16 fulcrumed at 17 on the main frame F. Each of these levers 16 preferably includes a bifurcated bell crank arm 18 in which an internally threaded sleeve or socket member 19 is trunnioned as at 20. An adjusting screw 21 threaded into each said sleeve 19 has an externally projecting unthreaded shank 21a rotatable through a sleeve bearing 22 trunnioned in a bracket 23 on one of the frame members 2.

A crank 24 on each said screw 21 provides means for manually rotating said screw to axially adjust its position within its associated sleeve 19. A spring 25 disposed under compression on the crank 21a between the crank 24 and the trunnion block 22 acts through the screw 21, threaded sleeve 19 and lever 16 to provide a floating support for its associated suspended portion of the sub-frame S.

The forward end of the sub-frame S is connected to the main frame F through a ball and socket joint 26 for universal movement whereby raising or lowering one side of the rake sub-frame S by actuation of its associated crank 24 will serve to tilt the said sub-frame about an axis extending through the universal joint 26 and the universal fittings or connections 12 or 13 as the case may be.

As may be clearly seen by reference to Figures 1 and 5 the socket portion of the ball and socket joint 26 is defined by a pair of opposed symmetrical socket members 27 bolted as at 27' or otherwise fixed to the forward converging ends of the sub-frame members 9—9 respectively, and drawn together in snug fitting operative relation about a ball member 28 by means of a bolt 29 passed transversely through the opposed socket members 27—27. It will be seen that the ball 28 is carried by a slide or control member 30 which is preferably integral therewith. This slide or control member 30 is adjustable to various positions along a bracket or guideway 31 fixed to the main frame and inclined forwardly and downwardly in a plane extending generally radially to the axis 12—13 and longitudinally of the main frame F so that adjustment of the position of the ball 28 may serve to swing the sub-frame S about its axis 12—13 while simultaneously causing bodily longitudinal movement of the sub-frame S to maintain operative clearance between said sub-frame and the rear wheel 8 adjacent the rearmost end of the raking reel 10.

In order to thus adjust the ball 28 and maintain it in any of its adjusted positions in the preferred embodiment its associated control member or base portion 30 is provided with a screw 32 disposed and guided through a rectilinear slot 33 extending in a vertical plane through the guideway or bracket 31. A nut 34 threaded on this bolt 32 may transmit pressure through washers 35 and 36 to draw the base or control element 30 tightly against the guideway 31 and maintain it in any desired position of adjustment, the nut 34 having previously been loosened to permit manual sliding of the control member 30 to such position in the slot. If desired, rotation of the nut 34 may be facilitated by means of a lever 37 insertable cross-wise or radially through appropriately disposed openings 37' (Figure 1) in the nut 34.

Thus it will be seen that the forward universal connection 26 may be adjusted vertically to cause tilting of the sub-frame S about the axis 12—13 parallel to the major axis of its rake basket 10 to thus tilt said basket and adjust the angle at which the teeth of the raking reel engage the ground as may be necessary to attain the most efficient raking action under varying conditions. However, in swinging the front end of the sub-frame S downwardly, it will be seen that the lower frame member 10a of the rake basket 10 which depends beneath the suspension point or fitting 12 and beneath the axis 12—13 just in advance of one of the wheels 8 will be swung rearwardly about the axis 12—13 toward the said wheel. However, the resulting forward bodily movement of the sub-frame S incident to such adjustment will be such as to maintain operating clearance between all portions of the sub-frame S and the said wheel 8 throughout the entire range of permissible adjustment.

Such bodily longitudinal displacement of the sub-frame S and its suspension points or pivotal connections 12 and 13 is permitted by forward swinging of the links 14 about their swingable connections 15 to levers 16 respectively. Thus it will be seen that the pivotal connections or universal suspension fittings 12 and 13 are mounted on the main frame F for longitudinal displacement together with the sub-frame S.

In order to laterally position the sub-frame S and maintain it against horizontal movement about its universal connection 26 a rigid stabilizing link 38 is pivotally connected between the main frame and the sub-frame as at 39 and 40 respectively. It will be seen that the pivotal connection 40 to the sub-frame S is to one of the rear depending leg portions 9a of one of the sub-frame members. This connection 40 is radially spaced from the axis 12—13 to such an extent that the longitudinal movement of this connection 40 responsive to angular adjustment of the sub-frame about its axis 12—13 is substantially equal and opposite to the resulting longitudinal bodily movement of sub-frame S. Were it not for this particular arrangement it will be seen that movement of the sub-frame forwardly would cause the link 38 to pull the sub-frame S toward the left in Figure 2 and thus into engagement with the adjacent wheel 8. Thus in addition to its general function of stabilizing the sub-frame S in a lateral direction, the link 38 performs a more specific function of maintaining operating clearance between the sub-frame S and the adjacent wheel 8 at all times.

Preferably the pivotal connection 39 between the fixed inner end of the stabilizing link 38 and the main frame F is positioned at a level which is midway of the range of vertical swinging movement of the connection 40 to the sub-frame S so that the arcuate movement of the connection 40 will cause only an unappreciable amount of lateral movement of the sub-frame S.

Since it will at times be desired to raise the sub-frame S to inoperative position about its forward universal connection 26, there is provided an automatic means for accomplishing this independently of the vertical adjustment of the rear pivotal supports or connections 12 and 13 of the sub-frame. For this purpose there is provided a lever 41 medially fulcrumed on a cross shaft 42 in the main frame F. The upper end of this lever 41 is connected by links 43—43 to the respective bell crank arms 18 of levers 16, whereby forward movement of the upper end of this lever 41 will act through the levers 16 to raise the sub-frame S. Actuation of the lever 41 may be accomplished conveniently through a hydraulic jack 44 operatively connected between the depending lower end of lever 41 and the bracket 45 fixed on the frame F. The hydraulic unit 44 may be operated from the hydraulic system on a usual farm tractor through conventional control mechanism on the tractor in a manner well known to the art.

While the drive end of a rake of this type, that is the rearmost end which is driven from the wheel 8, is comparatively heavy due to the fact that it provides a support for a gear box or other conventional drive transmitting mechanism, the other or foremost end of the rake basket 10 is relatively light and because of its resilient floating suspension above described, may be subjected to excessive and undesirable vertical vibration during passage of the implement over rough terrain. It is accordingly desirable to provide a suitable means for dampening this vibration. Such a means may be conveniently provided by forming the lever 16 adjacent that end of the rake basket with a depending friction arm 46 having a brake shoe 47 secured thereon for operative engagement with a friction plate 48 fixed on the inner face of its associated frame member 2. It will be apparent that the cooperation of this brake shoe 47 with the plate 48 will impose a drag on the swinging movement of the lever 16 and will thus tend to dampen the vibration of the rake basket 10 in a vertical direction.

Thus in the operation of the hay rake it will be seen that either of the cranks 24 may be manually actuated to adjust its respective side of the sub-frame and rake basket 10 about an axis extending through the universal connections 26 and 12 or 13 as the case may be. With the sub-frame S in any of these adjusted positions, the ball element of the ball socket joint 26 may be adjusted to any desired position along the longitudinally inclined vertical trackway or guideway 31 to rock the sub-frame S about the diagonal axis 12—13 and thereby regulate the angle at which the tines of the raking reel engage the ground. At the same time the resulting longitudinal movement of the sub-frame S, due to the longitudinal component of the guideway 31, will maintain the sub-frame S always clear of the adjacent wheel 8. Moreover the stabilizing link 38 which serves to laterally position the rear end of the sub-frame S, due to the location of its pivotal connection with the said sub-frame, will not laterally deflect the sub-frame despite such longitudinal adjustment thereof.

Also it will be seen that by virtue of hydraulic unit 44 and its linkage 41, 43—43, with the lever arms 18, the sub-frame S and raking mechanism therein may be raised to inoperative position at any time without affecting the adjustment of the cranks 24 which individually control the respective levers 16. The vibration dampening means 46—48 will, of course, serve to prevent vibration of the lighter forward end of the rake basket 10, and thereby will contribute to its efficient operation.

In this application we have shown and described only the preferred embodiment of the invention simply by way of illustration of the preferred mode contemplated by us of carrying out the invention, and we recognize that the invention is susceptible of modification. Accordingly, the drawings and description herein are to be considered merely illustrative in nature, and not as excluding other embodiments of the invention falling within the scope of the appended claims.

We claim:

1. A side delivery rake comprising a main frame having a forward hitch for connection to a tractor and rear supporting wheels, a pair of levers fulcrumed on said frame in diagonally horizontally spaced relation, links universally connected to said respective levers, a sub-frame universally connected to each of said links for swinging movement about a diagonal axis extending between said links, a rake basket carried by the sub-frame with its major axis parallel to said diagonal axis, said basket depending below the diagonal axis just in advance of one of the said wheels, a downwardly and forwardly inclined guideway carried by the main frame forwardly of said diagonal axis, a slide adjustable in said guideway, said slide being universally connected to the sub-frame whereby adjustment of the slide along said guideway will simultaneously cause a longitudinal bodily adjustment of the sub-frame and diagonal axis and an angular adjustment of the sub-frame about its said axis, in combination with a rigid link connected transversely between said frame and the rake basket to laterally position the rake basket, the connection of said link to the rake basket being so spaced below said diagonal axis that the movement of said connection responsive to angular adjustment of the sub-frame is substantially equal and opposite to the resulting bodily movement of the sub-frame.

2. A side delivery rake comprising a main frame having rear supporting wheels, a sub-frame suspended beneath said main frame for adjustment about an axis extending generally diagonally to the line of draft of the main frame and for bodily adjustment in a direction along the line of draft, a rake basket fixedly supported from said sub-frame in advance of said wheels, said sub-frame having a forward end, a downwardly and forwardly inclined support member carried by said main frame forwardly of said axis, means pivotally connecting said forward end of said sub-frame to said member, said connecting means being adjustable, selectively, up or down, on said support member and in a direction parallel to the incline of the member whereby said sub-frame is rocked about said axis and simultaneously adjusted along said line of draft.

3. A side delivery rake comprising a main frame having rear supporting wheels, a sub-frame suspended beneath said main frame for adjustment about an axis extending generally diagonally to the line of draft of the main frame and for bodily adjustment in a direction along the line of draft, a rake basket fixedly supported from said sub-frame in advance of said wheels and extending in a direction generally parallel to said axis, said rake basket having a leading end and a trailing end, said trailing end being positioned relatively close to one of said supporting wheels, said sub-frame having a forward end and a pair of depending rear legs one of which is adjacent said one supporting wheel, a support member having a downwardly and forwardly inclined guideway, means universally connecting said forward end of said sub-frame to said support member, said connecting means being adjustable, selectively, up or down, on said support member and in said forwardly inclined guideway whereby said sub-frame is rocked about said axis and simultaneously adjusted along the line of draft.

4. A side delivery rake comprising a main frame having rear supporting wheels, a sub-frame suspended beneath said main frame for adjustment about an axis extending generally diagonally to the line of draft of the main frame and for bodily adjustment in a direction along the line of draft, a rake basket fixedly supported from said sub-frame in advance of said wheels and extending in a direction generally parallel to said axis, said rake basket having a leading end and a trailing end, said trailing end being positioned relatively close to one of said supporting wheels, said sub-frame having a forward end and a pair of depending rear legs one of which is adjacent said one supporting wheel, a support member having a downwardly and forwardly inclined guideway, a control element adjustable up or down on said support member and in said forwardly inclined guideway, means pivotally connecting said control element and said forward end of said sub-frame whereby when said control member is adjusted said sub-frame is rocked about said axis and simultaneously adjusted along the line of draft, such adjustment along the line of draft maintaining a desired operating clearance between said trailing end of said rake basket and said one supporting wheel.

5. A side delivery rake comprising a main frame having rear supporting wheels, a sub-frame, including a rake basket, suspended beneath said main frame for adjustment about an axis extending generally diagonally to the line of draft of the main frame and for bodily adjustment in a direction along the line of draft, said sub-frame having a forward end, a downwardly and forwardly inclined support member carried by said main frame forwardly of said axis, means pivotally connecting said forward end of said sub-frame to said member, said connecting means being adjustable, selectively, up or down, on said support member and in a direction parallel to the incline of the member whereby said sub-frame is rocked about said axis and simultaneously displaced along said line of draft, and a rigid link extending transversely to said line of draft and pivotally connected at one end to said main frame and at its opposite end to said sub-frame, the connection of said rigid link to said sub-frame being such and so spaced below the said axis that the displacement of the link when said sub-frame is displaced along said line of draft on adjustment of said connecting means is substantially equal and opposite to the movement of the link caused by the swinging movement of said sub-frame about said axis.

References Cited in the file of this patent

UNITED STATES PATENTS

| | | |
|---|---|---|
| 2,649,681 | Hill | Aug. 25, 1953 |
| 2,658,324 | Johnson | Nov. 10, 1953 |
| 2,672,005 | Hamilton | Mar. 16, 1954 |

FOREIGN PATENTS

| | | |
|---|---|---|
| 46,289 | Denmark | Sept. 26, 1932 |
| 855,475 | Germany | Nov. 13, 1952 |